(12) United States Patent
Lee (10) Patent No.: US 11,562,274 B2
(45) Date of Patent: Jan. 24, 2023

(54) METHOD FOR IMPROVING MAINTENANCE OF COMPLEX SYSTEMS

(71) Applicant: Naval Information Warfare Center, Pacific, San Diego, CA (US)

(72) Inventor: Dean-Yue Lee, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 535 days.

(21) Appl. No.: 16/725,833

(22) Filed: Dec. 23, 2019

(65) Prior Publication Data
US 2021/0192379 A1    Jun. 24, 2021

(51) Int. Cl.
  *G06N 7/00*   (2006.01)
  *G06F 16/901*  (2019.01)
  *G06F 16/22*   (2019.01)

(52) U.S. Cl.
  CPC ......... *G06N 7/005* (2013.01); *G06F 16/2282* (2019.01); *G06F 16/9024* (2019.01)

(58) Field of Classification Search
  None
  See application file for complete search history.

(56) References Cited

U.S. PATENT DOCUMENTS

| | | | |
|---|---|---|---|
| 6,850,252 B1 | 2/2005 | Hoffberg | |
| 7,813,822 B1 | 10/2010 | Hoffberg | |
| 7,974,714 B2 | 7/2011 | Hoffberg | |
| 8,539,359 B2 | 9/2013 | Rapaport et al. | |
| 8,676,937 B2 | 3/2014 | Rapaport et al. | |
| 10,142,276 B2 | 11/2018 | Rapaport et al. | |
| 10,252,145 B2 | 4/2019 | Tran et al. | |
| 2007/0053513 A1 | 3/2007 | Hoffberg | |
| 2009/0271443 A1* | 10/2009 | Haas | G06F 16/217 |
| 2012/0290950 A1 | 11/2012 | Rapaport et al. | |
| 2014/0344718 A1 | 11/2014 | Rapaport et al. | |

(Continued)

OTHER PUBLICATIONS

Goodrich, Michael & Roberto Tamassia, "Algorithm Design and Applications", 2015, Wiley & Sons, Inc., Chapter 13, pp. 353-396. (Year: 2015).*

(Continued)

*Primary Examiner* — Scott A. Waldron
(74) *Attorney, Agent, or Firm* — Naval Information Warfare Center, Pacific; Kyle Eppele; Paul C. Oestreich (57) ABSTRACT

A computer-implemented method of improving maintenance of a complex system, the complex system having a plurality of components, the method involving: preparing data across a plurality of data streams from a plurality of data sources; generating a matrix representation of the data; calculating a time proximity of the data; calculating a plurality of corresponding cell values of the matrix representation; matching event information across the plurality of data streams from a plurality of data sources, the plurality of data sources corresponding to the plurality of components, wherein at least one data stream of the plurality of data streams has at least one of low fidelity data and imprecise event generation information; and scoring the imprecise event generation information across the plurality of data streams, thereby providing a score indicating a match quality of the imprecise event generation information.

20 Claims, 8 Drawing Sheets

(56) References Cited

U.S. PATENT DOCUMENTS

| | | |
|---|---|---|
| 2017/0235848 A1 | 8/2017 | Van Dusen et al. |
| 2018/0001184 A1 | 1/2018 | Tran et al. |
| 2018/0234744 A1 | 10/2018 | Cella et al. |
| 2018/0284735 A1 | 10/2018 | Cella et al. |
| 2018/0284736 A1 | 10/2018 | Cella et al. |
| 2018/0284737 A1 | 10/2018 | Cella et al. |
| 2018/0284741 A1 | 10/2018 | Cella et al. |
| 2018/0284742 A1 | 10/2018 | Cella et al. |
| 2018/0284743 A1 | 10/2018 | Cella et al. |
| 2018/0284745 A1 | 10/2018 | Cella et al. |
| 2018/0284746 A1 | 10/2018 | Cella et al. |
| 2018/0284747 A1 | 10/2018 | Cella et al. |
| 2018/0284749 A1 | 10/2018 | Cella et al. |
| 2018/0284752 A1 | 10/2018 | Cella et al. |
| 2018/0284753 A1 | 10/2018 | Cella et al. |
| 2018/0284754 A1 | 10/2018 | Cella et al. |
| 2018/0284755 A1 | 10/2018 | Cella et al. |
| 2018/0284757 A1 | 10/2018 | Cella et al. |
| 2018/0284758 A1 | 10/2018 | Cella et al. |
| 2018/0299878 A1 | 10/2018 | Cella et al. |
| 2018/0321666 A1 | 11/2018 | Cella et al. |
| 2018/0321667 A1 | 11/2018 | Cella et al. |
| 2018/0321672 A1 | 11/2018 | Cella et al. |
| 2019/0025805 A1 | 1/2019 | Cella et al. |
| 2019/0025806 A1 | 1/2019 | Cella et al. |
| 2019/0033845 A1 | 1/2019 | Cella et al. |
| 2019/0033847 A1 | 1/2019 | Cella et al. |
| 2019/0041835 A1 | 2/2019 | Cella et al. |
| 2019/0041836 A1 | 2/2019 | Cella et al. |
| 2019/0041840 A1 | 2/2019 | Cella et al. |
| 2019/0041843 A1 | 2/2019 | Cella et al. |
| 2019/0041845 A1 | 2/2019 | Cella et al. |
| 2019/0041846 A1 | 2/2019 | Cella et al. |
| 2019/0109810 A1 | 4/2019 | Rapaport et al. |
| 2019/0121333 A1 | 4/2019 | Cella et al. |
| 2019/0121338 A1 | 4/2019 | Cella et al. |
| 2019/0121339 A1 | 4/2019 | Cella et al. |
| 2019/0121343 A1 | 4/2019 | Cella et al. |
| 2019/0121344 A1 | 4/2019 | Cella et al. |
| 2019/0121345 A1 | 4/2019 | Cella et al. |
| 2019/0121348 A1 | 4/2019 | Cella et al. |
| 2019/0121349 A1 | 4/2019 | Cella et al. |
| 2019/0121350 A1 | 4/2019 | Cella et al. |
| 2019/0129404 A1 | 5/2019 | Cella et al. |
| 2019/0129405 A1 | 5/2019 | Cella et al. |
| 2019/0129406 A1 | 5/2019 | Cella et al. |
| 2019/0129407 A1 | 5/2019 | Cella et al. |
| 2019/0129408 A1 | 5/2019 | Cella et al. |
| 2019/0129409 A1 | 5/2019 | Cella et al. |
| 2019/0129410 A1 | 5/2019 | Cella et al. |
| 2019/0137985 A1 | 5/2019 | Cella et al. |
| 2019/0137987 A1 | 5/2019 | Cella et al. |
| 2019/0137988 A1 | 5/2019 | Cella et al. |
| 2019/0137989 A1 | 5/2019 | Cella et al. |
| 2019/0146472 A1 | 5/2019 | Cella et al. |
| 2019/0146473 A1 | 5/2019 | Cella et al. |
| 2019/0146474 A1 | 5/2019 | Cella et al. |
| 2019/0146475 A1 | 5/2019 | Cella et al. |
| 2019/0146476 A1 | 5/2019 | Cella et al. |
| 2019/0146477 A1 | 5/2019 | Cella et al. |
| 2019/0146478 A1 | 5/2019 | Cella et al. |
| 2019/0146479 A1 | 5/2019 | Cella et al. |
| 2019/0146480 A1 | 5/2019 | Cella et al. |
| 2019/0146481 A1 | 5/2019 | Cella et al. |
| 2019/0146482 A1 | 5/2019 | Cella et al. |
| 2019/0155263 A1 | 5/2019 | Cella et al. |
| 2019/0155272 A1 | 5/2019 | Cella et al. |
| 2019/0179300 A1 | 6/2019 | Cella et al. |
| 2019/0179301 A1 | 6/2019 | Cella et al. |
| 2019/0187680 A1 | 6/2019 | Cella et al. |
| 2019/0187681 A1 | 6/2019 | Cella et al. |
| 2019/0187682 A1 | 6/2019 | Cella et al. |
| 2019/0187683 A1 | 6/2019 | Cella et al. |
| 2019/0187684 A1 | 6/2019 | Cella et al. |
| 2019/0187685 A1 | 6/2019 | Cella et al. |
| 2019/0187686 A1 | 6/2019 | Cella et al. |
| 2019/0187687 A1 | 6/2019 | Cella et al. |
| 2019/0187688 A1 | 6/2019 | Cella et al. |
| 2019/0187689 A1 | 6/2019 | Cella et al. |
| 2019/0187690 A1 | 6/2019 | Cella et al. |
| 2019/0219995 A1 | 7/2019 | Cella et al. |
| 2019/0219996 A1 | 7/2019 | Cella et al. |
| 2019/0227536 A1 | 7/2019 | Cella et al. |
| 2019/0227537 A1 | 7/2019 | Cella et al. |
| 2020/0151199 A1* | 5/2020 | Nakamura ............ G06F 16/285 |

OTHER PUBLICATIONS

Moreno, Nathalie, et al., "Managing Measurement and Occurrence Uncertainty in Complex Event Processing Systems", (Jun. 19, 2019) in IEEE Access, vol. 7, pp. 88026-88048. (Year: 2019).*

* cited by examiner

METHOD FOR IMPROVING MAINTENANCE OF COMPLEX SYSTEMS

FEDERALLY-SPONSORED RESEARCH AND DEVELOPMENT

The United States Government has ownership rights in the subject matter of the present disclosure. Licensing inquiries may be directed to Office of Research and Technical Applications, Naval Information Warfare Center, Pacific, Code 72120, San Diego, Calif., 92152; telephone (619) 553-5118; email: niwc_pacific_t2@navy.mil. Reference Navy Case No. 104201.

TECHNICAL FIELD

The present disclosure technically relates to system maintenance. Particularly, the present disclosure technically relates to methods for improving system maintenance.

BACKGROUND OF THE INVENTION

In the related art, various related art methods have been implemented for maintaining systems, such as complex mechanical systems. In related art methods, many data streams or data feeds may indicate partial states of the related art complex mechanical systems. The information aggregated from these data streams or data feeds are used to glean information regarding a complete state of such system at any instance in time. In related art methods, various techniques are used for generating such data streams or data feeds. For example, sensors may provide continuous data readings relating to each component in a related art system. Another example involves using data logs to indicate past maintenance actions which have been performed on the related art system. Yet another example involves tracking a supply chain of each component in a related art system. In general, a myriad of data sources may indicate various aspects of a related art system. As a whole, these data sources may provide insights for preventive actions, thereby decreasing system-maintenance cost over a system-lifespan.

Related art methods of maintaining systems include techniques, such as manually matching event information by manually inspecting data, wherein such manual inspection is error-prone, and automatically matching event names, wherein the timestamp information contained in the data sources is frequently inaccurate, thereby failing to capture important relationships among all the data sources. Other challenges experienced in the related art methods include differing data from data source to data source, reporting duplicative and contradictory data, and varying event-timestamp accuracy from data source to data source. Further, when a component fault occurs, the related art protocol involves investigating the relationship between the component and past maintenance actions. Furthermore, conclusions are drawn by incorporating prior knowledge of the component health, e.g. whether the component tends to provide incorrect data readings. However, due to difficulty experienced in correlating events across many disparate data sources in the related art, such conclusion is usually where the investigation terminates.

Thus, decisions in the related art are based on a set of incomplete information regarding the related art system. Therefore, a need exists in the related art for a method of improving complex system maintenance.

SUMMARY OF INVENTION

To address at least the needs in the related art, the present disclosure involves a computer-implemented method of improving maintenance of a complex system, the complex system comprising a plurality of components, the method comprising: matching event information across a plurality of data streams from a plurality of data sources, the plurality of data sources corresponding to the plurality of components, wherein at least one data stream of the plurality of data streams comprises at least one of low fidelity data and imprecise event generation information; and scoring the imprecise event generation information across the plurality of data streams, thereby providing a score indicating a match quality of the imprecise event generation information, in accordance with an embodiment of the present disclosure.

BRIEF DESCRIPTION OF THE DRAWING(S)

The above, and other, aspects, features, and benefits of several embodiments of the present disclosure are further understood from the following Detailed Description of the Invention as presented in conjunction with the drawings.

Corresponding reference numerals or characters indicate corresponding components throughout the drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood, elements that are useful or necessary in commercially feasible embodiment are often not depicted in order to facilitate a less obstructed view of these various embodiments of the present disclosure.

DETAILED DESCRIPTION OF THE EMBODIMENT(S)

Figure 1:
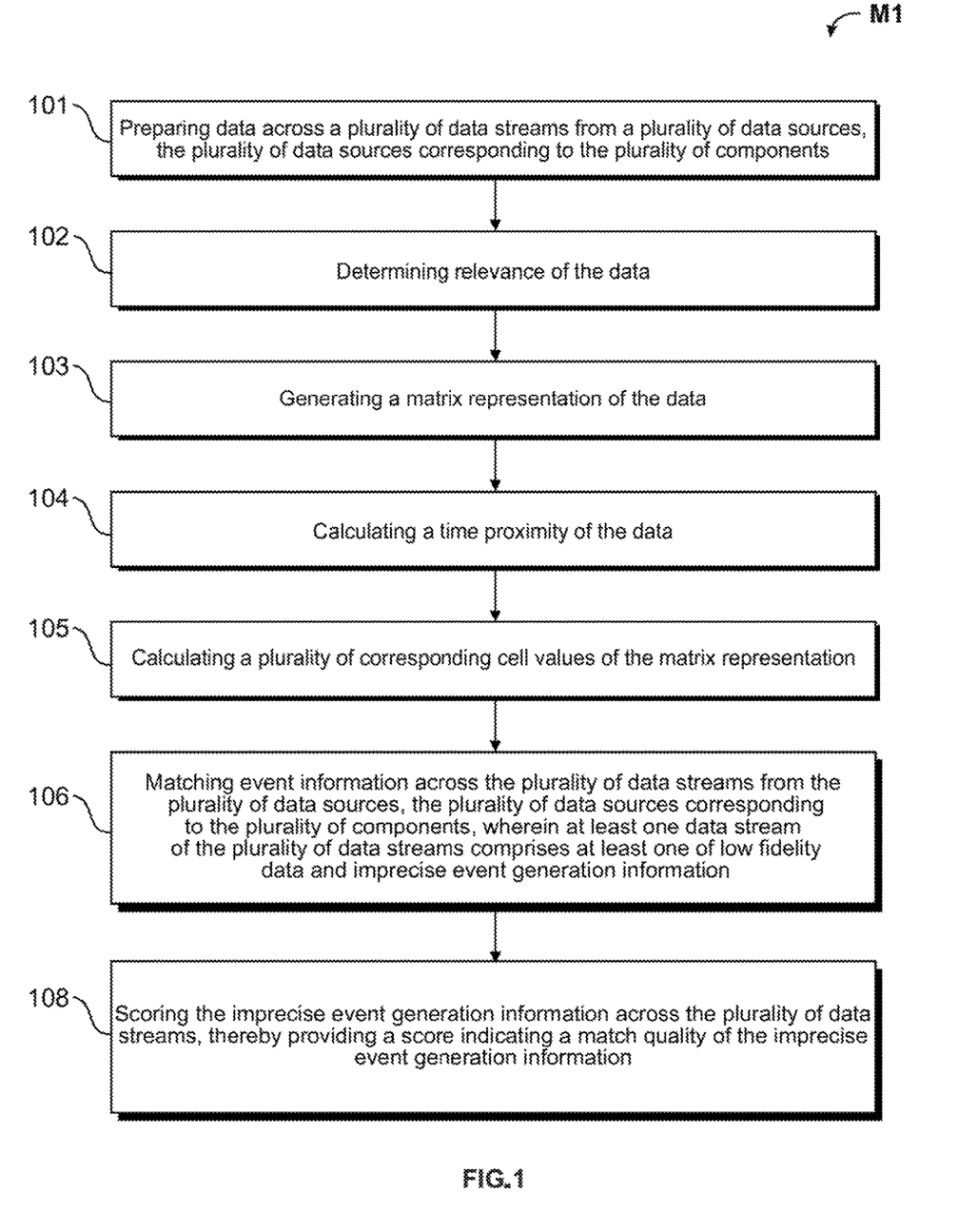
FIG. 1 is a flow diagram illustrating a computer-implemented method of improving complex system maintenance in accordance with an embodiment of the present disclosure.

Referring to FIG. 1, this flow diagram illustrates a computer-implemented method M1 of improving complex system maintenance comprises: preparing data across a plurality of data streams from a plurality of data sources, the plurality of data sources corresponding to the plurality of components, as indicated by block 101; determining relevance of the data, as indicated by block 102; generating a matrix representation of the data, as indicated by block 103; calculating a time proximity of the data, as indicated by block 104; calculating a plurality of corresponding cell values of the matrix representation, as indicated by block 105; matching event information across the plurality of data streams, wherein at least one data stream of the plurality of data streams comprises at least one of low fidelity data and imprecise event generation information, as indicated by block 106, in accordance with an embodiment of the present disclosure. The method M1 further comprises scoring the event information across the plurality of data streams, wherein a higher score indicates a better event information match, as indicated by block 107. The order of the steps, as indicated by blocks 101 through 107, may be performed in any other order, such any other order also being encompassed by the present disclosure.

Figure 2:
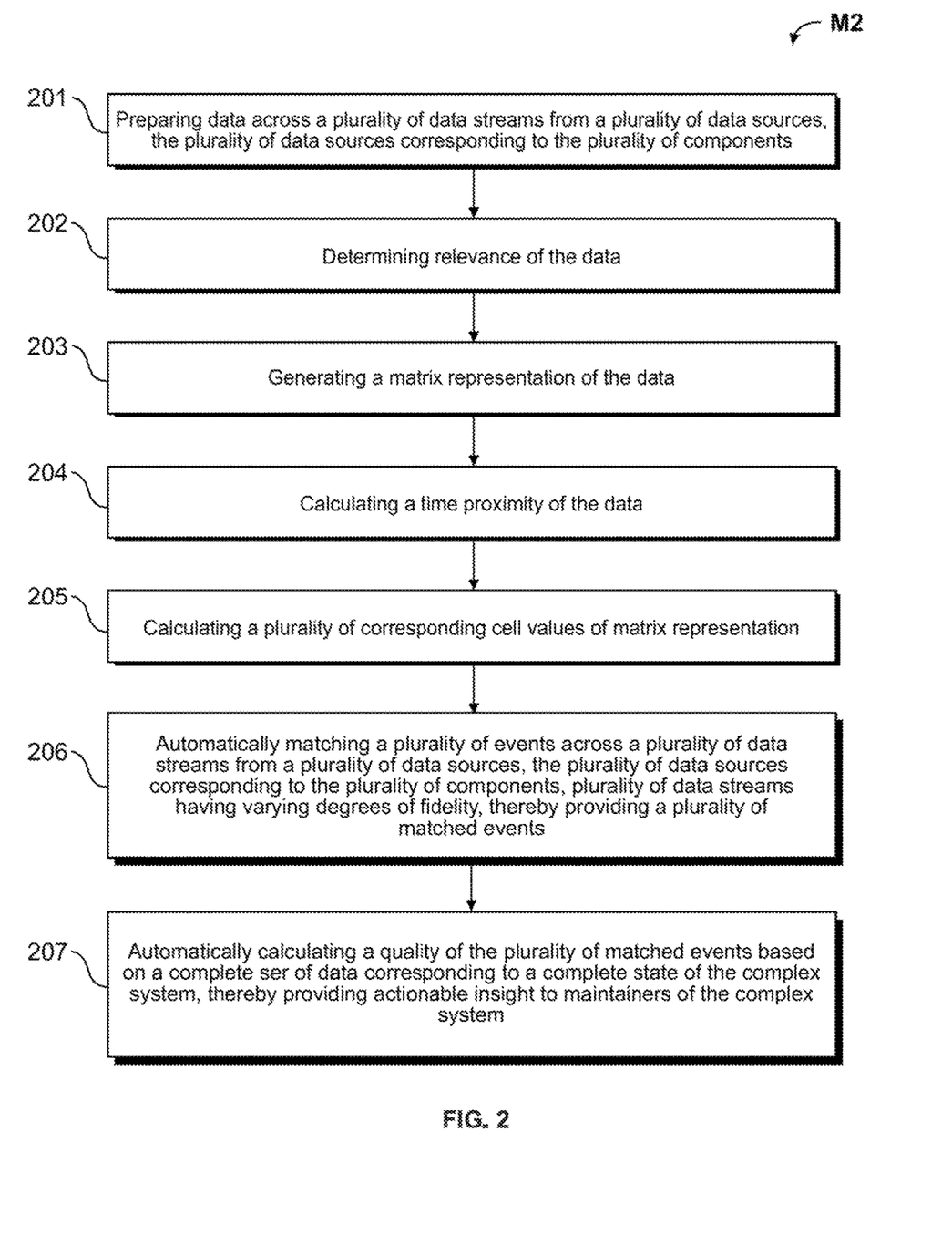
FIG. 2 is a flow diagram illustrating a computer-implemented method of improving complex system maintenance, in accordance with an embodiment of the present disclosure.

Referring to FIG. 2, this flow diagram illustrates a computer-implemented method M2 of improving complex system maintenance comprises: preparing data across a plurality of data streams from a plurality of data sources, the plurality of data sources corresponding to the plurality of components, as indicated by block 201; determining relevance of the data, as indicated by block 202; generating a matrix representation of the data, as indicated by block 203; calculating a time proximity of the data, as indicated by block 204; calculating a plurality of corresponding cell values of the matrix representation, as indicated by block 205; automatically matching events across the plurality of data streams corresponding to a plurality of components having varying degrees of fidelity, thereby providing a plurality of matched events, as indicated by block 206, in accordance with an embodiment of the present disclosure. The method M2 further comprises automatically calculating quality of the matched events based on a complete set of data corresponding to a complete state of the complex system, as indicated by block 207. The method M2 provides actionable insight for maintaining the complex system. The order of the steps, as indicated by blocks 201 through 207, may be performed in any other order, such any other order also being encompassed by the present disclosure.

Figure 3:
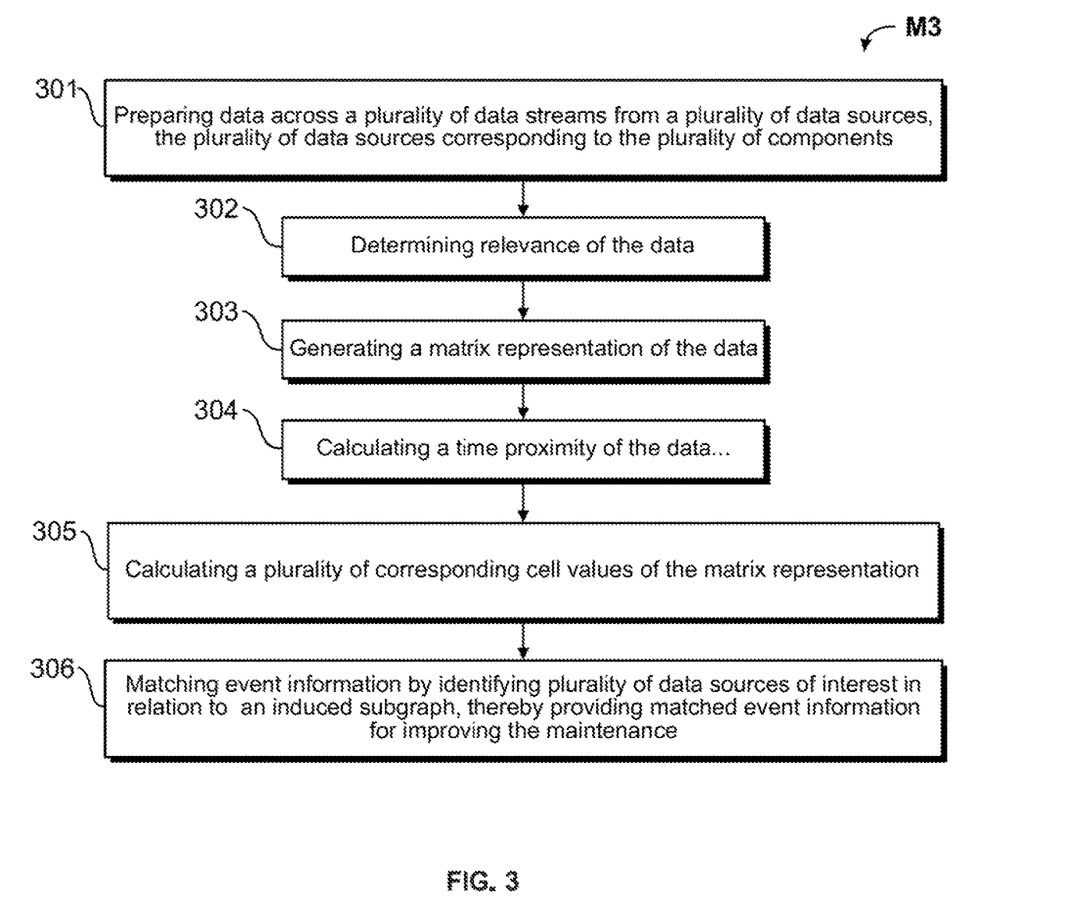
FIG. 3 is a flow diagram illustrating a computer-implemented method of improving complex system maintenance, in accordance with an embodiment of the present disclosure.

Referring to FIG. 3, this flow diagram illustrates a computer-implemented method M3 of improving complex system maintenance comprises: preparing data across a plurality of data streams, preparing the data comprising gathering the data and storing the data, as indicated by block 301; determining relevance of the data, comprising determining a relationship of the data among the plurality of data streams, as indicated by block 302; generating a matrix representation of the data, as indicated by block 303; calculating a time proximity of the data, as indicated by block 304; calculating corresponding cell values of the matrix representation, as indicated by block 305; and matching event information by identifying data sources of interest from the plurality of data sources in relation to an induced subgraph, as indicated by block 306, thereby providing matched event information for improving the system maintenance, in accordance with an embodiment of the present disclosure. The order of the steps, as indicated by blocks 301 through 306, may be performed in any other order, such any other order also being encompassed by the present disclosure.

Figure 3A:
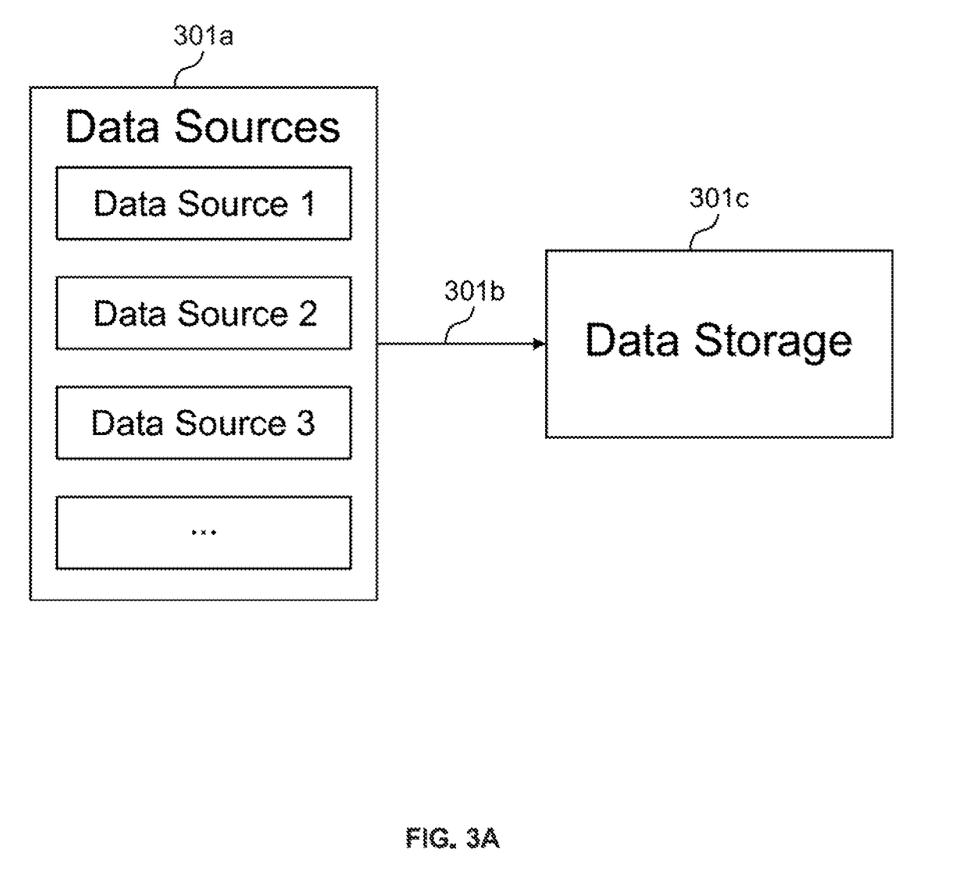
FIG. 3A is a diagram illustrating the step of preparing data, in accordance with an embodiment of the present disclosure.

Referring to FIG. 3A, this diagram illustrates the step of preparing data, as indicated by block 301, comprising: gathering the data across the plurality of data streams from the plurality of data sources 301a; transmitting the data by an input 301b to a data storage system 301c; and storing the data in the data storage system 301c, e.g., comprising a nontransient memory device, in accordance with an embodiment of the present disclosure.

Figure 3B:
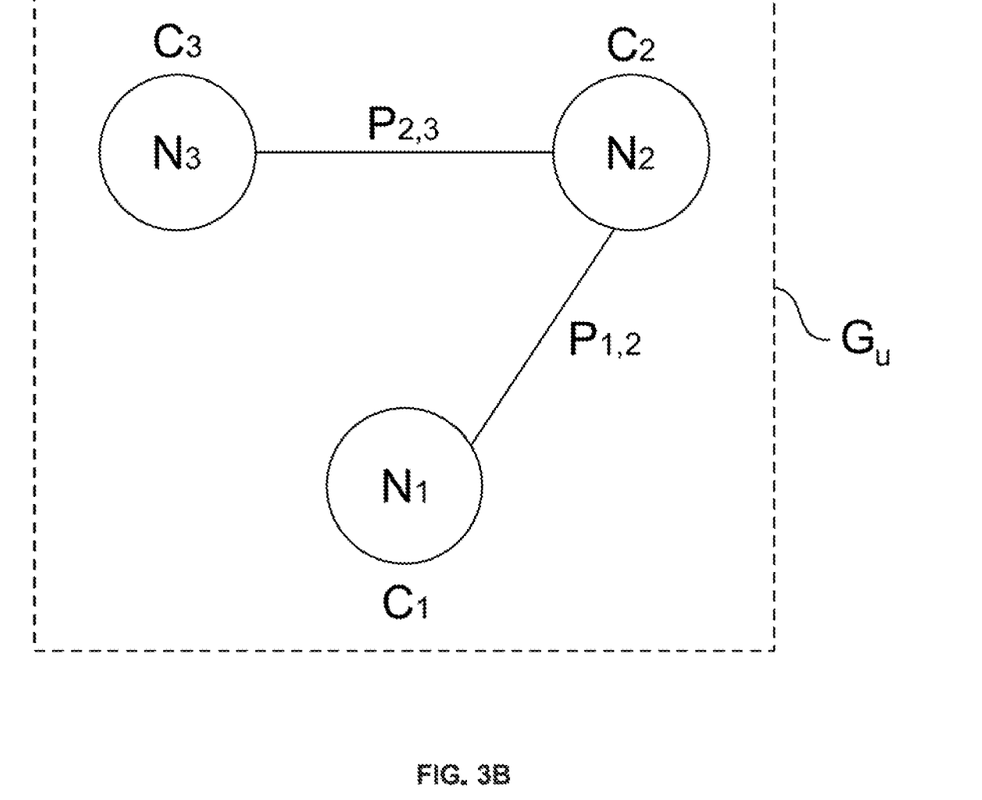
FIG. 3B is a diagram illustrating the step of determining relevance of the data, in accordance with an embodiment of the present disclosure.

Referring to FIG. 3B, this diagram illustrates the step of determining relevance of the data, as indicated by block 302, comprising generating an undirected graph $G_u$ to capture the relationship among all the data sources of the plurality of data sources 301a, in accordance with an embodiment of the present disclosure. Every node, e.g., nodes $N_1$, $N_2$, $N_3$ in the undirected graph $G_u$, represents a data source. For any pairs of nodes $N_i$, $N_j$ in the undirected graph $G_u$, the edge weight comprises a plausibility value $P_{i,j}$, wherein the plausibility value $P_{i,j}$ is a metric corresponding to the similarity between the datasets, wherein i is an integer, and wherein j is an integer. A higher plausibility $P_{i,j}$ value, corresponding to a particular pair of nodes $N_i$, $N_j$, equates or corresponds to a higher similarity relative to another pair of nodes $N_i$, $N_j$. The edge weight further comprises a confidence value $C_i$ associated with each node $N_i$, wherein the confidence value $C_i$ is a metric corresponding to the quality of the data, and wherein a higher confidence value $C_i$, corresponding to a particular node $N_i$, equates or corresponds to a higher quality relative to another node $N_i$.

Still referring to FIG. 3B, the nodes, e.g., the nodes $N_1$, $N_2$, $N_3$ in the undirected graph $G_u$ correspond to the plurality of data sources 301a. The node weights and edge weights are determined by subject matter experts (SMEs), wherein SMEs comprise expert opinion information based on both mathematical techniques, e.g., by implementing artificial intelligence, e.g., machine-learning, and intuition, wherein the edge weights comprise metrics relating to the plausibility value $P_{i,j}$, and wherein the node weights comprise metrics relating to the confidence value $C_i$. The confidence value $C_i$ is measured by the SMEs' confidence in the respective quality of data that is being captured by the respective data sources of the plurality of data sources 301a. The plausibility value is measured by the SMEs' intuition in relation to the likelihood that two data sources 301a of the plurality of data sources 301a should be connected or associated in the undirected graph $G_u$. Using this artificial intelligence technique in combination with intuition, calculating correlation of datasets, from the respective data sources of the plurality of data sources 301a, enhances the step of determining relevance of the data, as indicated by block 302, beyond that which is possible by mere human intuition.

Still referring to FIG. 3B, generating the undirected graph comprises: generating a plurality of nodes corresponding to the plurality of data sources; and determining node weights and edge weights by applying information from a plurality of subject matter experts (SMEs), wherein information from the SMEs comprises expert opinion information from the SMEs that is based on a combination of artificial intelligence and intuition, wherein the node weights comprise metrics relating to confidence values measured by the SMEs' confidence in the respective quality of data being captured by the respective data sources of the plurality of data sources, and wherein the edge weights comprise metrics relating to plausibility values measured by the SMEs' intuition in relation to the likelihood that two data sources of the plurality of data sources should be associated.

Still referring to FIG. 3B, by example only, the node $N_1$, corresponding to a first data source of the plurality of data sources 301a, may capture data relating to sensor readings of an aircraft (not shown); and the node $N_2$, corresponding to a second data source of the plurality of data sources 301a, may capture data relating to all maintenance actions for that aircraft. Then, based on previous experience, the SMEs assign a confidence value $C_1$, e.g., a higher confidence value $C_1$ for the node $N_1$, corresponding to the first data source, relative to another confidence value $C_2$, for a node $N_2$, corresponding to the second data source, for at least that the first data source is captured by a first data-capturing technique, e.g., a sensor coupled with a computer device, which is deemed less error-prone in relation to a second data-capturing technique for the second data source.

Still referring to FIG. 3B, by example only, based on previous experience, the SMEs assign a confidence value $C_2$ for the node $N_2$, corresponding to the second data source, e.g., a lower confidence value $C_2$ relative to the confidence value $C_1$, for at least that the second data source is captured by a second data-capturing technique, e.g., manual data entry into a computer device, which is deemed more error-prone, e.g., prone to data entry mistakes, in relation to the first data-capturing technique. The plausibility value $P_{i,j}$, corresponding to the pair of nodes $N_1$, $N_2$ could be high, relative to a plausibility value, corresponding to another pair of nodes, for at least that the sensor readings and the maintenance actions should have a direct impact on each other. For example, a maintenance action that is performed in order to calibrate a sensor would have a direct impact on the sensor reading; and, for example, a malfunctioning sensor would directly trigger a maintenance action.

Figure 3C:
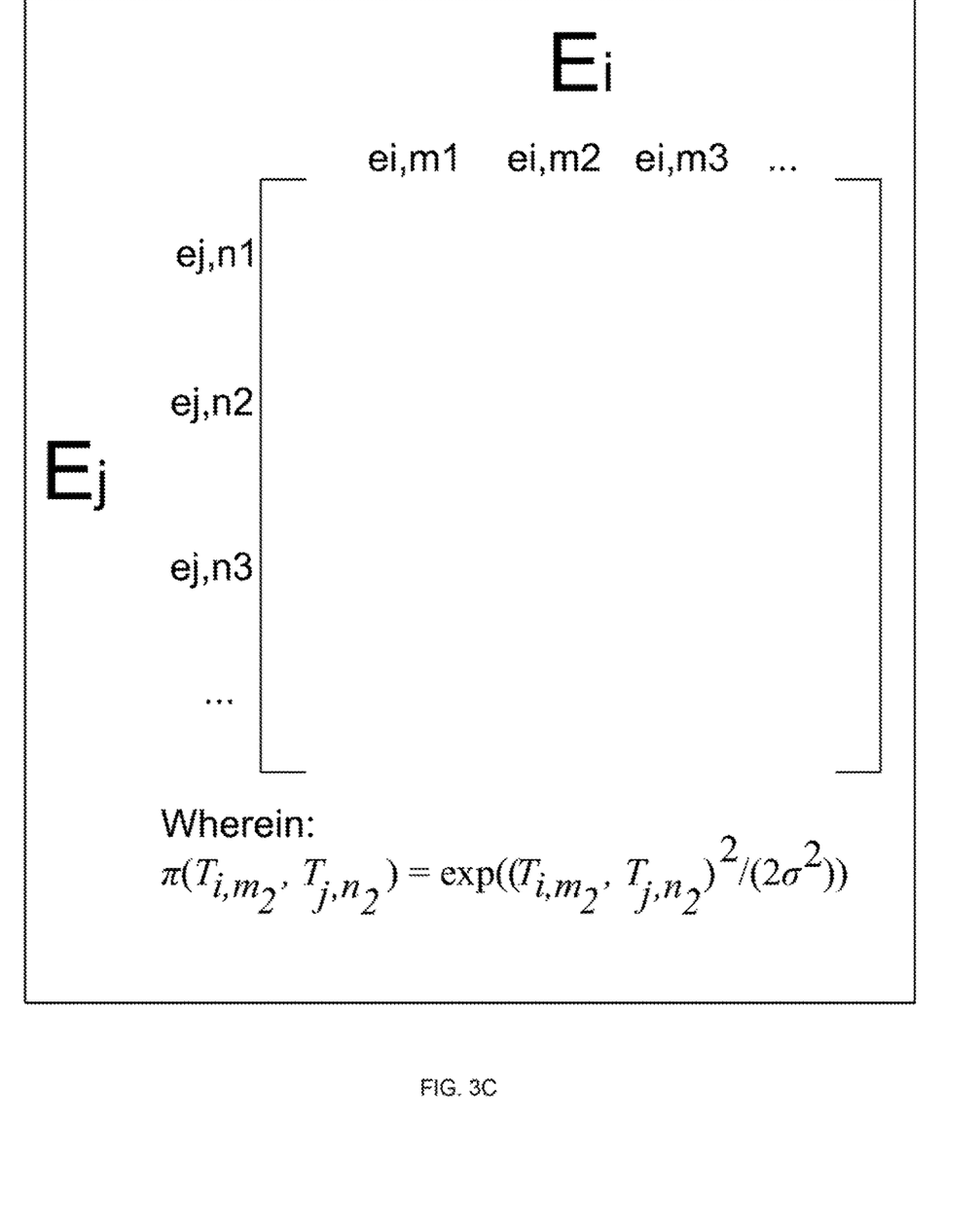
FIG. 3C is a diagram illustrating the step of generating a matrix representation of the data, in accordance with an embodiment of the present disclosure.

Referring to FIG. 3C, this diagram illustrates the step of generating a matrix $M_{i,j}$ comprising a representation of the data, as indicated by block 303, in accordance with an embodiment of the present disclosure. The matrix $M_{i,j}$ is generated for every pair of nodes $N_i$, $N_j$, to capture the graphical relationships described in the undirected graph $G_u$ (FIG. 3B). The plurality of rows $E_j$ and the plurality of columns $E_i$ are identified by the unique event information. For the nodes $N_i$, $N_j$, let $E_i$ (columns) and $E_j$ (rows) correspond to data from all data events that are respectively captured by the nodes $N_i$ and $N_j$. Further, every event $e_{i,m}$ in the columns $E_i$ and every event $e_{j,n}$ in the rows $E_j$ is associated with a respective timestamp value, e.g., $T_{i,m_2}$, $T_{j,n_2}$. Thus, the matrix $M_{i,j}$, for the nodes $N_i$ and $N_j$, comprises events represented in the columns $E_i$ and represented in the rows $E_j$, wherein the events $E_i$, $E_j$ are sorted by respective timestamp values, e.g., $T_{i,m_2}$, $T_{i,n_2}$, in the respective columns and rows, and wherein all values of $e_{i,m}$ and $e_{j,n}$, in terms of m and n, are ordered by time, e.g., by the relationship $\pi(T_{i,m_2}, T_{j,n_2})=\exp((T_{i,m_2}-T_{j,n_2})^2/2\sigma^2)$, by example only.

Still referring to FIG. 3C and referring back to FIGS. 3 and 3B, in the step of calculating a time proximity of the data, as indicated by block 304, for event $e_{i,m}$ in the columns $E_i$ and event $e_{j,n}$ in the rows $E_j$, the timestamp values are respectively denoted by $T_{i,m}$ and $T_{j,n}$, in accordance with an embodiment of the present disclosure. The corresponding time proximity value $\pi(T_{i,m}, T_{j,n})$ of the two events, e.g., an event $e_{i,m}$ in the columns $E_i$ and an event $e_{j,n}$ in the rows $E_j$, is then calculated according to an equation $\pi(T_{i,m}, T_{j,n})=\exp((T_{i,m}-T_{j,n})^2/2\sigma^2)$. The step of calculating the plurality of corresponding cell values of a matrix representation, as indicated by block 305, for a matrix $M_{i,j}$, comprises associating a confidence value $C_i$ for the node $N_i$ with a confidence value $C_j$ for the node $N_j$ in the undirected graph $G_u$ (FIG. 3B). The corresponding cell values in the matrix $M_{i,j}$ are then computed by the following equation $\pi(T_{i,m}, T_{j,n})*C_i*C_j$.

Figure 3D:
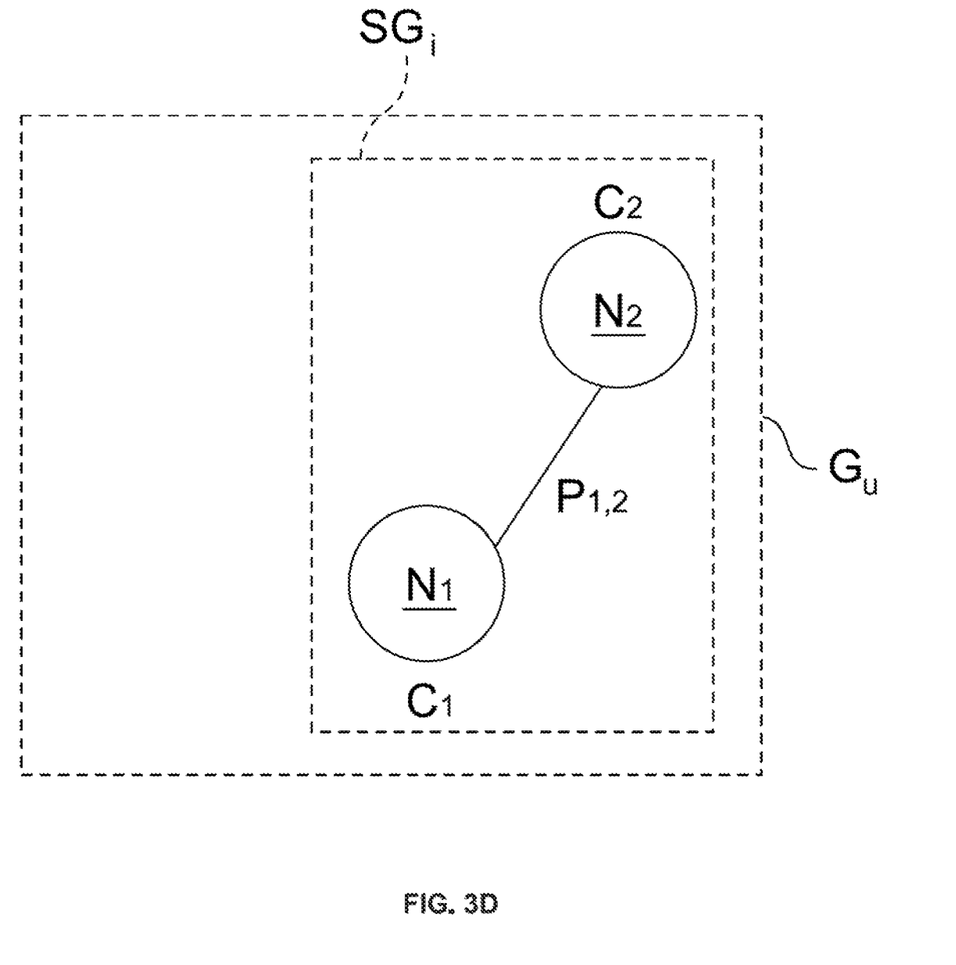
FIG. 3D is a diagram illustrating the step of matching event information by identifying data sources of interest in relation to an induced subgraph, in accordance with an embodiment of the present disclosure.

Referring to FIG. 3D, this diagram illustrates the step of matching event information by identifying data sources of interest in relation to an induced subgraph $SG_i$, as indicated by block 306, comprising first identifying the data sources of interest, e.g., relating to the node $N_1$ and the node $N_2$, having an edge weight comprising a plausibility value $P_{1,2}$ within an induced subgraph $SG_i$, in accordance with an embodiment of the present disclosure. By example only, the node $N_1$ and the node $N_2$ correspond to data sources being respectively represented by the columns $E_i$ and the rows $E_j$, wherein the events represented by the columns $E_i$ are denoted by $E_{i,m}$ for m≥1, and wherein the events represented by the rows $E_j$ are denoted by $E_j$,n for n≥1. The step of matching event information further comprises: selecting, from the matrix $M_{i,j}$, a specific event $E_{i,m}$ from the columns $E_i$; identifying all relevant events in the rows $E_j$ where the cell values ($T_{i,m}$, $T_{j,n}$) are greater than a predetermined threshold, e.g., 0.9, thereby providing the induced subgraph $SG_i$ representing the nodes $N_1$, $N_2$ with the events represented by $E_{i,m_1}$, $E_{j,n_1}$, $E_{j,n_2}$, ..., wherein $\pi(T_{i,m_1}, T_{j,n_1}) \geq 0.9$, wherein $\pi(T_{i,m_1}, T_{i,m_2}) \geq 0.9, \ldots$.

Figure 3E:
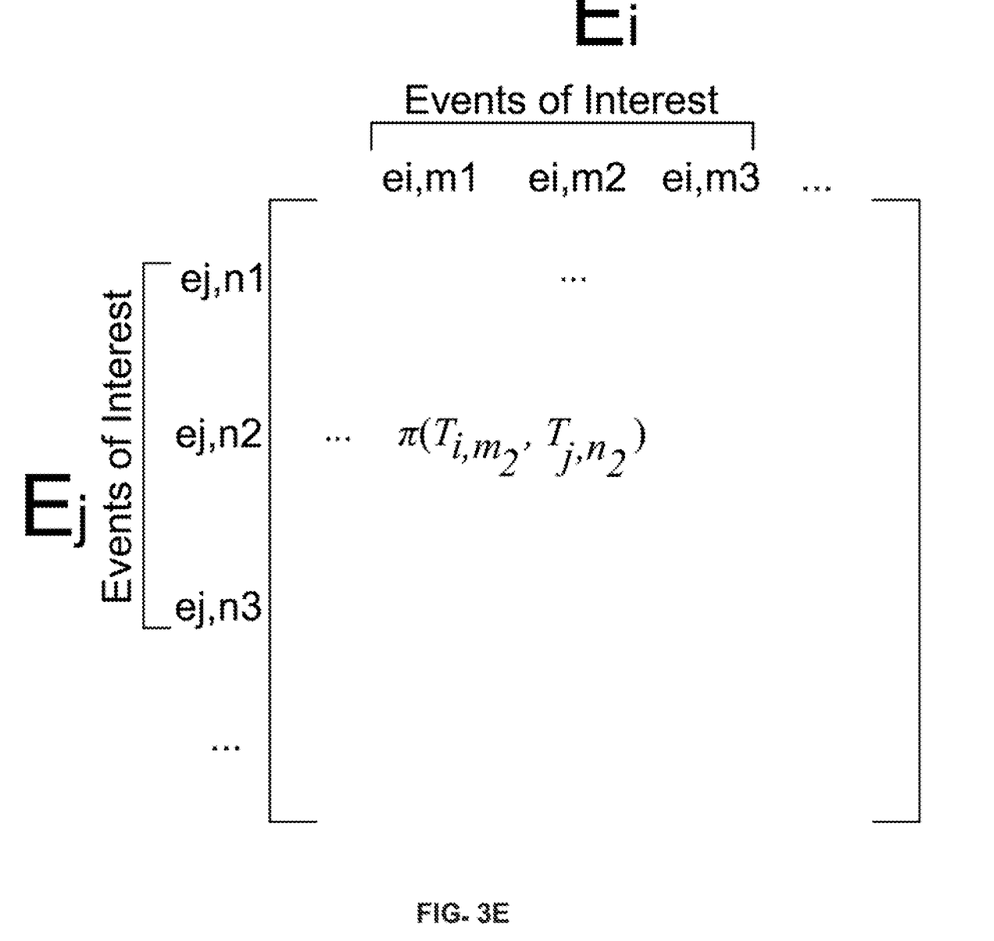
FIG. 3E is a diagram illustrating the step of matching event information by identifying data sources of interest in relation to the induced subgraph, in accordance with an embodiment of the present disclosure.

Referring to FIG. 3E, this diagram illustrates the step of matching event information by identifying data sources of interest in relation to the induced subgraph $SG_i$, as indicated by block 306, in accordance with an embodiment of the present disclosure. The step of matching event information by identifying data sources of interest in relation to the induced subgraph $SG_i$ further comprises traversing the induced subgraph $SG_i$. Along the traversal, the similarity value, confidence value, and time proximity values are fused into a relevance score. The output is a list of events sorted by relevance scores. By example only, let the columns $E_i$ represent a data source comprising sensor data for an aircraft and let the rows $E_j$ represent a data source comprising all maintenance actions performed on that aircraft. If a bearing sensor detects a component failure, such event would be deemed an "event of interest" and represented in the columns $E_i$, e.g., a bearing failure event at a time $T_{i,m_1}$. Traversing the induced subgraph $SG_i$ comprises identifying all the maintenance actions performed $E_{j,n_1}$, $E_{j,n_2}$, ... from $E_j$, wherein $\pi(T_{i,m_1}, T_{j,n_1}) \geq 0.9$, wherein $\pi(T_{i,m_1}, T_{j,n_2}) \geq 0.9, \ldots$.

Referring back to FIGS. 3-3E, the methods of the present disclosure may be implemented to improve complex system maintenance for aircraft, such as the V-22 Osprey, or any other craft, including ground vehicles and sea vessels, having a sensor system platform, any sensor system platform that also has auxiliary information relating to the platform itself, any sensor system platform having real-time recorded data, e.g., pilot logs, any system platform receiving and joining data from a plurality of different data services, and any Internet-of-Things (IoT) system. Complex system maintenance includes, but is not limited to, preventing vibration exceedance in real time, preventing component failure, providing root cause analysis. By example only, if a pilot frequently banks an aircraft in a given direction, the methods of the present disclosure can identify component failure caused by the left-banking tendency (deemed an "even of interest"). Also, the methods of the present disclosure can be implemented in relation to a plurality of different data sources respectively corresponding to a plurality of components. Pairing nodes may also be determined by a degree of overlap of attributes between any two data sources, wherein the two data sources will be associated, connected, or joined, via an "edge" of a graph.

The embodiments of the present disclosure involve methods of improving system maintenance, whereby relationships among a plurality of events in an arbitrary time frame are quantifiable from a plurality of disparate data sources having varying degrees of quality. By implementing embodiments of the present disclosure with complex systems, including, but not limited to, complex mechanical systems, complex electrical systems, and complex electromechanical systems, seemingly unrelated events are matched, and seemingly unrelated events are automatically correlated.

Alternative embodiments of the present disclosure include, but are not limited to, a method comprising adapting the metrics and algebra of the foregoing calculating steps to specific implementations. Alternative embodiments of the present disclosure include, but are not limited to, a method comprising determining a time metric, wherein the time metric is not limited to Gaussian distance. The algebra for the combination of confidence and plausibility values is also customizable and adaptable to specific use cases.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed:

1. A computer-implemented method of improving maintenance of a complex system, the complex system comprising a plurality of components, the method comprising:
   preparing data across a plurality of data streams from a plurality of data sources, the plurality of data sources corresponding to the plurality of components;
   determining relevance of the data;
   generating a matrix representation of the data;
   calculating a time proximity of the data;
   calculating a plurality of corresponding cell values of the matrix representation;
   matching event information across the plurality of data streams from the plurality of data sources, the plurality of data sources corresponding to the plurality of components, wherein at least one data stream of the plurality of data streams comprises at least one of low fidelity data and imprecise event generation information; and
   scoring the imprecise event generation information across the plurality of data streams, thereby providing a score indicating a match quality of the imprecise event generation information.

2. A computer-implemented method of improving maintenance of a complex system, the complex system comprising a plurality of components, the method comprising:
   preparing data across a plurality of data streams from a plurality of data sources, the plurality of data sources corresponding to the plurality of components;
   generating a plurality of nodes corresponding to the plurality of data sources;
   determining node weights and edge weights by applying information from a plurality of subject matter experts (SMEs);
   wherein the information from the SMEs comprises expert opinion information from the SMEs;
   wherein the node weights comprise metrics relating to confidence values measured by the expert opinion information from the SMEs to determine confidence in the respective quality of data being captured by the respective data sources of the plurality of data sources;
   wherein the edge weights comprise metrics relating to plausibility values measured by the expert opinion information from the SMEs, namely likelihood that two data sources of the plurality of data sources should be associated;
   generating a matrix representation of the data;
   calculating a time proximity of the data;
   calculating a plurality of corresponding cell values of the matrix representation;
   automatically matching a plurality of events across the plurality of data streams from the plurality of data sources, the plurality of data sources corresponding to the plurality of components, plurality of data streams having varying degrees of fidelity, thereby providing a plurality of matched events; and
   automatically calculating a quality of the plurality of matched events based on a complete set of data corresponding to a complete state of the complex system, thereby providing actionable insight for maintaining the complex system.

3. A computer-implemented method of improving maintenance of a complex system, the complex system comprising a plurality of components, the method comprising:
   preparing data across a plurality of data streams from a plurality of data sources, the plurality of data sources corresponding to the plurality of components;
   determining relevance of the data;
   generating a matrix representation of the data;
   calculating a time proximity of the data;
   calculating a plurality of corresponding cell values of the matrix representation; and
   matching event information by identifying plurality of data sources of interest of the plurality of data sources in relation to an induced subgraph, thereby providing matched event information for improving the maintenance.

4. The method of claim 3, wherein preparing data comprises:
   gathering the data across the plurality of data streams from the plurality of data sources;
   transmitting the data by an input device to a data storage system; and
   storing the data in the data storage system.

5. The method of claim 3, wherein determining relevance of the data comprises determining a relationship of the data among the plurality of data streams.

6. The method of claim 5, wherein determining the relationship of the data among the plurality of data streams comprises generating an undirected graph.

7. The method of claim 6, wherein generating the undirected graph comprises:
   generating a plurality of nodes corresponding to the plurality of data sources; and
   determining node weights and edge weights by applying information from a plurality of subject matter experts (SMEs),
   wherein information from the SMEs comprises expert opinion information from the SMEs;
   wherein the node weights comprise metrics relating to confidence values measured by the expert opinion information from the SMEs to determine confidence in respective quality of data being captured by respective data sources of the plurality of data sources, and
   wherein the edge weights comprise metrics relating to plausibility values measured by the expert opinion information from the SMEs is used to determine the likelihood that two data sources of the plurality of data sources should be associated.

8. The method of claim 7, wherein generating the plurality of nodes comprises assigning an edge weight corresponding to a similarity between datasets for any pair of nodes of the plurality of nodes.

9. The method of claim 8, wherein generating the plurality of nodes comprises determining a value of the similarity corresponds to a value of the edge weight, thereby providing a similarity value.

10. The method of claim 9, wherein determining the value of the similarity comprises associating the similarity value with a confidence value.

11. The method of claim 10, wherein associating the similarity value with the confidence value comprises indicating a quality of the data.

12. The method of claim 6, wherein generating the matrix representation of the data comprises generating a matrix to capture a graphical relationship corresponding to the undirected graph for every pair of nodes.

13. The method of claim 12, wherein generating the matrix representation comprises generating a plurality of rows and a plurality of columns, the plurality of rows and the plurality of columns corresponding to the matched event information.

14. The method of claim 13, wherein generating the plurality of rows and the plurality of columns comprises indicating a pair of events corresponding to a pair of nodes.

15. The method of claim 14, wherein indicating the pair of events corresponding to the pair of nodes comprises associating each event with a timestamp value, thereby generating a matrix for the pair of nodes having a plurality of columns corresponding to a plurality of events $E_i$ and a plurality of rows corresponding to a plurality of events $E_j$, thereby sorting the plurality events by a plurality of timestamp values in the plurality of columns and the plurality of rows, and thereby ordering all values of m and n, $e_{i,m}$ and $e_{j,n}$ by time, wherein $e_{i,m}$ are events in column $E_i$, $e_{i,n}$ are events in row $E_j$ and i, j, m and n are integers.

16. The method of claim 15, wherein calculating a time proximity of the data comprises denoting the plurality of timestamp values by $T_{i,m}$ and $T_{j,n}$, respectively, for an event $e_{i,m}$ in $E_i$ and an event $e_{j,n}$ in $E_j$.

17. The method of claim 16, wherein calculating the time proximity of the data comprises calculating a corresponding time proximity value $\pi(T_{i,m}, T_{j,n})$ of two events according to an equation $\pi(T_{i,m}, T_{j,n})=\exp((T_{i,m}, T_{j,n})^2/(2\sigma^2))$.

18. The method of claim 17, wherein calculating the plurality of corresponding cell values of the matrix representation comprises associating a confidence value $C_i$ with a node $N_i$ and associating a confidence value $C_j$ with a node $N_j$ in the induced subgraph for a matrix $M_{i,j}$.

19. The method of claim 18, wherein calculating the plurality of corresponding cell values of the matrix representation comprises calculating the plurality of corresponding cell values in the matrix $M_{i,j}$ by an equation $\pi(T_{i,m}, T_{j,n})*C_i*C_j$.

20. The method of claim 3,
wherein matching event information by identifying a plurality of data sources of interest in relation to the induced subgraph comprises matching a plurality of events by identifying a plurality of data sources of interest in relation to the induced subgraph, and
wherein identifying a plurality of data sources of interest comprises traversing the induced subgraph from a node corresponding to a plurality of events of interest and a time range of interest,
thereby fusing similarity values, confidence values, and time proximity values into relevance scores, and
thereby providing output comprising a list of events sorted by the relevance scores.

* * * * *